United States Patent [19]

Grube

[11] Patent Number: 4,654,913
[45] Date of Patent: Apr. 7, 1987

[54] METHOD FOR MANUFACTURE OF CAPTIVE NUT AND WASHER

[75] Inventor: William L. Grube, Lake Bluff, Ill.

[73] Assignee: MacLean-Fogg Company, Mundelein, Ill.

[21] Appl. No.: 804,826

[22] Filed: Dec. 5, 1985

[51] Int. Cl.⁴ .......................................... B21D 53/24
[52] U.S. Cl. ..................................................... 10/86 R
[58] Field of Search ................ 10/86 R, 86 CL, 86 F; 411/39, 43, 180, 181, 155, 265, 270, 427, 432, 533

[56] References Cited

U.S. PATENT DOCUMENTS

| | | | |
|---|---|---|---|
| 2,380,994 | 8/1945 | Pummill | 411/270 |
| 2,520,259 | 8/1950 | Pummill | 411/265 |
| 3,141,182 | 7/1964 | Lanius, Jr. | 10/86 |
| 3,602,976 | 9/1971 | Grube | 29/407 |
| 3,727,254 | 4/1973 | Tildesley | 10/86 R |
| 3,728,933 | 4/1973 | Grube | 85/61 |
| 3,862,458 | 1/1975 | Stanaitis | 10/155 A |
| 4,431,353 | 2/1984 | Capuano | 10/86 R X |

FOREIGN PATENT DOCUMENTS 4185 9/1979 European Pat. Off. ............ 411/155
2138529 10/1984 United Kingdom ................ 411/533

Primary Examiner—E. Michael Combs
Attorney, Agent, or Firm—Krass & Young

[57] ABSTRACT

A method for producing captive washer wheel nuts. The washer and nut body are formed as a single piece, greatly simplifying and reducing the number of separate manufacturing steps, such as threading and forming bearing surfaces on the washer and nut body. An axially symmetric frusto-conical groove at an oblique angle to the axis of symmetry is formed in the nut-washer blank. The groove is sufficiently deep to be closer to the axis of symmetry than a small-radius concave feature on the underside of the washer. Upon application of axial compression, the washer separates from the nut body along a frusto-conical fracture surface defined between the bottom of the groove and the concave feature on the washer. The orientation of this fractured surface causes the washer to be captured to the nut body.

5 Claims, 3 Drawing Figures

METHOD FOR MANUFACTURE OF CAPTIVE NUT AND WASHER

FIELD OF THE INVENTION

This invention relates to a method for manufacturing wheel nuts having a captive washer and, more particularly, to a method for manufacturing wheel nuts having a captured washer in which the nut body and washer are placed into captive relationship by fracturing a single-piece axial nut-washer blank by applying axial compression to the blank.

BACKGROUND OF THE INVENTION

Nuts with captive washers have obvious advantages in applications where it is desirable to fasten a nut and a washer to a threaded fastener in an efficient manner. The washer permits clamping forces to be distributed over a larger area while the nut undergoes relative rotational motion with respect to the washer. They clearly obviate the need for separate steps to install a washer and a nut and eliminate the possibility of using the wrong washer-nut combination. They also simplify problems associated with storage of parts.

Nuts with captive washers are known in the prior art for use in applications demanding highly repeatable fastening torque characteristics. An example is a heavy-duty truck wheel nut application, where safety demands that the truck wheels be installed in a highly reliable and repeatable manner. The outstanding performance of these fasteners is due to the fact that the nut body and the washer have well-matched bearing surfaces which allow low-friction rotational motion between the nut and washer.

In the prior art, it is known to manufacture such captive washer wheel nuts from two pieces, the nut body and the washer, with a flange on the nut body being staked after the parts are assembled to make the washer captive. Obviously, this method of manufacture involves both more processing steps and more pieces to be handled.

Gundersen, et. al., U.S. Pat. No. 1,868,415, discloses a method for producing a washer loosely captive to the head end of a screw by breaking away the washer from the screw body. The washer is formed between two grooves perpendicular to the axis of the screw between the screw head and the threaded shank. The groove closer to the screw head has a smaller diameter than the outer diameter of the threaded shank. The washer is broken away by subjecting it to axial forces directed toward the screw head. The washer is then retained by the resulting frusto-conical breakaway surface on the shank of the screw. This breakaway surface extends beyond the shank-facing side of the washer as the washer is moved toward the screw head. Because most washer-nut applications do not allow portions of the nut to extend beyond the load-facing side of the washer, this method is not suitable for producing nuts with captive washers.

Two patents issued to Pummill, U.S. Pat. Nos. 2,380,994 and 2,520,259, disclose nuts with breakaway washers. However, the washers are intentionally caused to become fixed to the nut as the washer is forced toward the nut it is tightened on a bolt. Because of metal deformation which occurs as the washer is forced toward the nut, the washer is permanently and rotationally fixed against the nut.

Tildesley, U.S. Pat. No. 3,727,254, discloses a method of forming an insert bushing including a ring which, upon use of the bushing, breaks away from the body of the bushing and subsequently undergoes metal deformation to become contiguous with and axially captive to the body of the bushing. Until this metal deformation, the ring is not captive to the bushing body.

It is desirable, therefore, to have a method of manufacturing captive washer wheel nuts which can be treated as a single unit the washers are separated from, and made captive to, the nut body.

SUMMARY OF THE INVENTION

This invention solves the problem of manufacturing a captive washer wheel nut by retaining the nut body and washer as a single entity throughout most of the manufacturing steps until they are separated from each other. By maintaining the nut body and washer as a single entity, many processing steps which have heretofore been performed on the nut body and washer separately, can be performed simultaneously. Further, the bearing surface between the washer and the nut body can be made especially well-matched by this method of manufacturing.

According to one aspect of the invention, a captured washer wheel nut can be manufactured from a single piece axially symmetric nut-washer blank by forming a coaxial frusto-conical groove in the blank to define the nut body-washer bearing surface. The groove produced has a smaller inner diameter than an axially symmetric small-radius concave feature on the washer end of the nut-washer blank. Only a relatively thin web of material separates the bottom of the groove and the concave feature. The washer and nut body are disjoined by the application of axial compression to the nut-washer blank, causing it to fracture along another frusto-conical surface, serving as a flange tapering toward the nut end of the nut-washer blank. After this fracture, the washer is retained captive by the nut body flange formed.

DETAILED DESCRIPTION OF THE PREFERRED EMBODIMENT

Figure 1:
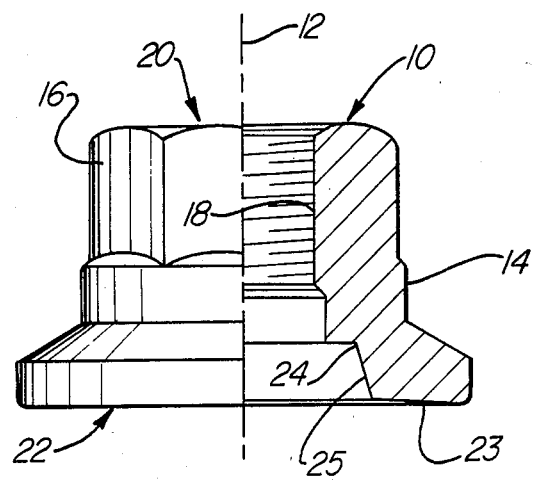
FIG. 1 shows a partial cross-sectional view of a nut-washer blank.

As shown by reference to FIG. 1 of the drawings, nut-washer blank 10 is axially symmetric about axis 12. Although, for manufacturing purposes, blank 10 is preferably formed by a hot-forming method, any alternative means for producing blank 10 may be used. Particularly suitable materials from which to make blank 10 are 1045 steel for the hot-forming process and 10B21 steel for a cold-forming process. These processes result in a Rockwell hardness ($R_c$) in the range of 26 to 32.

Blank 10 has an axially symmetric outer surface 14, which incorporates features such as wrenching flats 16. Axially symmetric inner surface 18 is a surface of revolution with respect to axis 12. A first axially-disposed end 20, nearest the wrenching flats 16, is the portion of nut-washer blank 10 which will form the nut body of the captive washer wheel nut at the end of the manufacturing process. A second axially-disposed end 22 contains primarily features which will form the washer of the captive washer wheel nut, including annular surface 23 which will face the wheel rim being clamped. Toward the second axially disposed end 22 of nut-washer blank 10 is an axially symmetric concave feature 24. As shown in FIG. 1, concave feature 24 has a circular shape whose radius of curvature is essentially zero. Frusto-conical surface 25 must taper toward first end 20 of blank 10, not toward second end 22.

Figure 2:
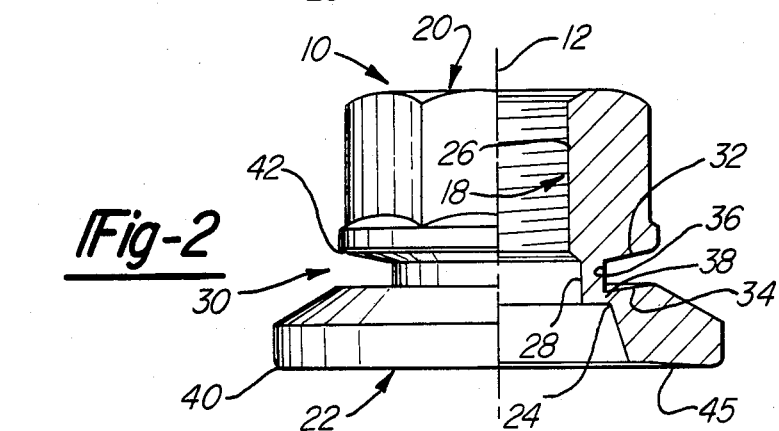
FIG. 2 shows a partial cross-sectional view of a nut-washer blank after a frusto-conical groove has been placed in the blank of FIG. 1.

FIG. 2 of the drawings shows nut-washer blank 10 at a later stage in manufacturing. In particular, threads 26 have been tapped into inner surface 18. The minimum inner diameter and the maximum inner diameter of the threaded portion of inner surface 18 are defined by the particular thread chosen. The thread can, for example, be ¾-16 UNF, a common thread used on truck wheel studs. The thread can be either left- or right-handed. A second portion 8, of inner surface 18 disposed toward the second end of nut-washer blank 10 from section 26 has a larger diameter with respect to axis 12 than the maximum inner diameter of section 26 of inner surface 18. This is to accommodate the unthreaded base portions of the wheel lug bolts to which the wheel nut will be fastened.

Another operation which has been performed upon the nut-washer blank 10 of FIG. 1 is the forming of groove 30. Groove 30 consists of three surfaces: nut bearing surface 32, washer bearing surface 34, and surface 36. In the preferred embodiment, each of these three surfaces is frusto-conical. Nut bearing surface 32 is inclined approximately 81° from axis 12, washer bearing surface 34 is inclined approximately 84° with respect to axis 12, and surface 36 is inclined at approximately 2° with respect to axis 12. The larger diameters of bearing surfaces 32 and 34 are closer to first end 20 of nut-washer blank 10 than are their smaller diameters. On the other hand, the larger diameter of surface 36 is disposed toward the second end 22 of blank 10.

Intersection 38 of bearing surface 34 and surface 36 is very sharp, having a maximum radius of curvature of 0.030 inches. The maximum radius of curvature of feature 24 is also 0.030 inch. The diameter from axis 12 to intersection 38 is slightly less than the diameter from axis 12 to concave feature 24. Axial and diametrical separations between intersection 38 and feature 24 are relatively small: preferably, the axial separation is between 0.050 and 0.060 inches, while the diametrical separation is between 0.020 and 0.040 inches. The axial separation between intersection 38 and feature 24 is preferably smaller than the axial separation between bearing surfaces 32 and 34. In the preferred embodiment at this stage of manufacturing, bearing surfaces 32 and 34 are separated by approximately 0.156 inches.

At the stage of manufacturing shown in FIG. 2, additional features have been imposed on both the nut and washer portions of nut-washer blank 10. In particular, corners 40 and 42 have been rounded and surface 45 of the washer portion of nut-washer blank 10 is given a small, approximately 2° inward bevel by machining annular surface 23 in FIG. 1. In some applications, the bevel is not needed, and will not be formed. In that case, nut bearing surface 32 and washer bearing surface 34 are parallel.

To the extent that threading, grooving, rounding and bevelling operations applied to nut-washer blank 10 do not interfere, they may be performed simultaneously. This results in a great economy as reflected in manufacturing costs. It has been discovered that manufacturing costs are reduced by approximately 40% when the wheel nut and washer can be processed as one piece.

Figure 3:
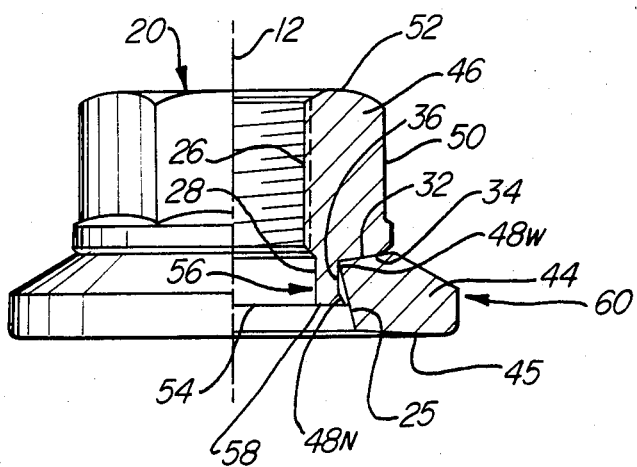
FIG. 3 shows the captive washer wheel nut which results after application of axial compression on the grooved nut-washer blank of FIG. 2.

FIG. 3 of the drawings shows the result of the last stage in manufacturing a captive washer wheel nut by this method. Application of 15 to 20 thousand pounds of axial compression along axis 12 of blank 10 causes washer 44 to fracture away from nut body 46. The frusto-conical surfaces created by this fracture are reliably and repeatably created by creating two small radius of curvature features (24 and 38, in FIG. 2), separated by only a thin web of material. As the axial compressive forces are applied, stress fields are produced at each concave feature—the smaller the radius of curvature, the higher the stress field. Therefore, the highest stresses in the nut-washer body occur between these two closely-located features, and fracture occurs preferentially between them. Fracture surfaces 48n and 48w were formerly contiguous, as shown in FIG. 2. Although shown with nut bearing surface 32 adjacent washer bearing surface 34, washer 44 is both axially and rotationally movable with respect to nut body 46.

Fracture surfaces 48n and 48w are approximately frusto-conical surfaces, with their smaller ends disposed toward the first end 20 of nut body 46. These surfaces retain washer 44 in captured relationship to nut body 46.

Nut body 46 consists of an inner threaded surface 26, an outer surface 50 (including wrenching flats), joined at the first end 20 by a first surface 52. Toward the second end 54 of nut body 46, are nut body bearing surface 32 and flange 56. Flange 56 itself comprises surface 36 resulting from the grooving operation shown in FIG. 2, fracture surface 48n, lower annular surface 58 (which is substantially perpendicular to axis 12), and unthreaded cylindrical inner surface 28.

Washer 44 consists of washer bearing surface 34, outer surface 60, bevelled surface 45, frusto-conical surface 25, and fracture surface 48w.

It is apparent that modifications of the disclosed preferred embodiment of the invention may be made by those skilled in the art without departing from the spirit and scope of the present invention. Accordingly, the scope of this invention is defined by the following claims.

What is claimed is:

1. A method for producing a wheel nut comprising a nut body and a washer unengageably captured thereto from an annular axially symmetric nut-washer blank of a metallic material, the nut-washer blank having a central axial bore, two axial ends, and having a nut portion substantially disposed toward a first axial end of the blank and a washer portion substantially disposed toward the second axial end of the blank, the method comprising the steps of:

(A) forming an axially symmetric frusto conical surface adjacent the second axial end of the blank tapering inwardly toward the first axial end of the blank to a minimum diameter greater than the diameter of the adjacent portion of the central bore of the blank;

(B) forming an annular shoulder between said frusto conical surface and the central bore of the blank intersecting said frusto conical surface at its minimum diameter, said intersection having a radius of curvature in a plane passing through the axis that is small relative to the diameter of the intersection;

(C) forming an axially symmetric groove in the nut-washer blank, the groove consisting of a first bearing surface on the nut portion, a second bearing surface on the washer portion, and a third surface therebetween, the intersection of the second and third surfaces having a radius of curvature in a plane passing through the axis that is small relative to the diameter of the intersection and having a diameter slightly less than the diameter of the intersection of said shoulder and said frusto-conical surface, the groove leaving a relatively thin web of material between said intersections; and (D) axially compressing the nut-washer blank to create a substantially frusto-conical fracture surface between said intersections, whereby the washer is rotatably captured on the nut body by the fracture surface.

2. The method of claim 1, wherein the first surface is a frusto-conical surface having its larger axial diameter disposed toward the first axial end of the blank.

3. The method of claim 1, wherein the first surface is a frusto-conical surface having its larger axial diameter disposed toward the first axial end of the blank and the second surface is a frusto-conical surface having its larger axial diameter disposed toward the first axial end of the blank.

4. The method of claim 3, wherein the first frusto-conical surface and the second frusto-conical surface are substantially parallel.

5. A method for producing a wheel nut comprising a nut body and a washer unengagably captured thereto from an annular axially symmetric nut-washer blank of a metallic material, the nut-washer blank having a central axial bore, two axial ends, and having a nut portion substantially disposed toward a first axial end of the blank and a washer portion substantially disposed toward the second axial end of the blank, the method comprising the steps of:

(A) forming an axially symmetric frusto-conical surface adjacent the second axial end of the blank tapering inwardly toward the first axial end of the blank to a minimum diameter greater than the diameter of the adjacent portion of the central bore of the blank;

(B) forming an annular shoulder between said frusto-conical surface and the central bore of the blank intersecting said frusto-conical surface at its minimum diameter, said intersection having a radius of curvature in a plane passing through the axis that is small relative to the diameter of the intersection;

(C) forming an axially symmetric groove in the nut-washer blank, the groove consisting of a first frusto-conical bearing surface on the nut portion having its greater diameter disposed toward the first axial end of the blank, an extension of the first frusto-conical surface forming an angle of approximately 81 degrees with the axis, a second frusto-conical bearing surface on the washer portion having its greater diameter disposed toward the first axial end of the blank, an extension of the second frusto-conical surface forming an angle of approximately 84 degrees with the axis, and a third frusto-conical surface therebetween, the third frusto-conical surface having its smaller diameter disposed toward the first axial end of the nut-washer blank, an extension of the third frusto-conical surface forming an angle approximately 2 degrees with the axis, the axially symmetric intersection of the second and third frusto-conical surfaces having a radius of curvature in a plane passing through the axis that is small relative to the diameter of the intersection and having a diameter that is slightly less than the diameter of the intersection of said shoulder with said frusto-conical surface minimum diameter, the groove leaving a relatively thin web of material between said intersections; and (D) axially compressing the nut-washer blank to create a substantially frusto-conical fracture surface between the said intersections, whereby the washer is rotatably captured on the nut body by the fracture surface.

* * * * *